United States Patent [19]

Levine et al.

[11] Patent Number: 5,194,486
[45] Date of Patent: Mar. 16, 1993

[54] ADHESIVE

[75] Inventors: Eli Levine, Union; Herbert L. Wolfson, Baldwin; Alvin H. Silverberg, East Brunswick, all of N.J.

[73] Assignee: H & N Chemical Company, N.J.

[21] Appl. No.: 609,591

[22] Filed: Nov. 6, 1990

Related U.S. Application Data

[63] Continuation-in-part of Ser. No. 562,435, Aug. 2, 1990, abandoned, which is a continuation of Ser. No. 364,006, Jun. 9, 1989, abandoned.

[51] Int. Cl.$^5$ .................. C08L 33/08; C08L 61/20; C08J 3/24; C08F 2/06
[52] U.S. Cl. ................... 524/556; 524/560; 525/154; 525/330.6; 525/370; 526/79; 526/84; 526/85; 526/279; 526/312; 526/328.5
[58] Field of Search ............ 524/547, 555, 556, 502, 524/560, 512, 559, 561, 700; 525/154, 330.6, 370; 526/79, 84, 85, 279, 312, 328.5

[56] References Cited

U.S. PATENT DOCUMENTS

| | | | |
|---|---|---|---|
| 3,532,708 | 10/1970 | Blance | 260/31.2 |
| 3,617,362 | 11/1971 | Bemmels et al. | 428/355 |
| 3,707,518 | 12/1972 | Bemmels et al. | 260/29.6 |
| 3,769,254 | 10/1973 | Anderson et al. | 524/357 |
| 3,920,600 | 11/1975 | Ahramjian | 260/29.7 |
| 3,923,752 | 12/1975 | Güse et al. | 260/78.5 |
| 4,005,247 | 1/1977 | Graham | 526/15 |
| 4,042,554 | 8/1977 | Poskitt | 260/29.7 |
| 4,128,518 | 12/1978 | Oyamada et al. | 428/523 |
| 4,140,668 | 2/1979 | Sumi et al. | 526/330 |
| 4,230,772 | 10/1980 | Swift et al. | 428/442 |
| 4,305,996 | 12/1981 | Schenk | 428/423.1 |
| 4,316,830 | 2/1982 | Mallon | 260/29.6 |
| 4,322,472 | 3/1982 | Kaspar et al. | 428/350 |
| 4,454,301 | 6/1984 | Cady et al. | 525/118 |
| 4,608,111 | 8/1986 | Hume, III et al. | 156/306.6 |
| 4,665,127 | 5/1987 | Hirose et al. | 525/100 |
| 4,702,496 | 10/1987 | Hume, III | 281/15 R |
| 4,721,750 | 1/1988 | Nakamura et al. | 524/547 |
| 4,810,523 | 3/1989 | Williams et al. | 427/36 |
| 4,853,436 | 8/1989 | Ohata et al. | 525/244 |
| 4,925,908 | 5/1990 | Bernard et al. | 526/320 |

FOREIGN PATENT DOCUMENTS

| | | |
|---|---|---|
| 0122457 | 10/1984 | European Pat. Off. . |
| 0183495 | 6/1986 | European Pat. Off. . |
| 2411169 | 9/1974 | Fed. Rep. of Germany . |

OTHER PUBLICATIONS

Derwent Accession, No. 88-320 210, Questel Telesystems (WPIL) Derwent Publications Ltd., London.

*Primary Examiner*—Joseph L. Schofer
*Assistant Examiner*—R. H. Delmendo
*Attorney, Agent, or Firm*—Ostrolenk, Faber, Gerb & Soffen

[57] ABSTRACT

Novel adhesive products are prepared by coating a novel adhesive formulation onto appropriate substrates. The adhesive formulation is capable of maintaining coatable viscosity at solids levels in excess of 58% and may comprise an interpolymer prepared in the presence of a high concentration of chain transfer agents, and may also comprise external and/or internal crosslinking agents. The Williams Plasticity Number of solids from the formulation may be less than 1.8 (determined in the absence of external crosslinking agents). Alkyl acrylamidoglycolate alkyl ether monomer copolymerized with a more reactive monomer provides an interpolymer having reduced need for strong acid catalysis.

25 Claims, No Drawings

ADHESIVE

RELATED APPLICATIONS

This application is a continuation-in-part of co-pending U.S. patent application Ser. No. 07/562,435 filed Aug. 2, 1990, now abandoned, which is in turn a continuation of U.S. patent application Ser. No. 364,006 filed Jun. 9, 1989, now abandoned. The disclosures of the foregoing parent and grandparent applications are incorporated by reference, as though fully set forth herein.

BACKGROUND OF THE INVENTION

The present invention relates to adhesive formulations for coating onto substrates of pressure-sensitive adhesive products, to pressure-sensitive adhesive products made from such formulations, and more particularly to storage-stable high solids adhesive formulations which may be used to prepare pressure-sensitive products exhibiting a balance of good peel and shear resistance, good tack and coatable viscosity. The invention further relates to novel methods for preparing adhesive formulations and to adhesive formulations and products which perform well at high temperatures.

The invention includes pressure-sensitive adhesives based upon polyacrylate copolymers. Adhesives of this basic type are known for their ability to provide desired tack without the addition of a tackifying resin and for good clarity and lack of color. Prior art adhesives of this type are sometimes sensitive to heat and solvents, and may be adversely affected thereby.

Pressure sensitive adhesives may be sold in solution form for application to desired substrates For environmental and economic reasons, it is desirable that the solution-based acrylic adhesive be made and applied at a solids level as high as is practicable. However, a proper balance of solution viscosity and adhesive properties has proven difficult to achieve at a high solids levels. Storage stability, particularly in the presence of reactive crosslinkers, has also proven difficult at such levels.

The prior art has attempted to solve these problems in a number of ways, but without entirely satisfactory results. For example, many high solids adhesives based upon acrylic latices have rheological deficiencies and frequently lack a proper balance of peel and shear resistance, and tack.

Higher solids solvent-based acrylic pressure sensitive adhesives, e.g. 58% solids (by weight) and higher, have viscosities so high as to make application difficult. While lower viscosities may be obtained through the use of lower molecular weight polymers, it becomes difficult to obtain a desirable balance of physical properties in the final adhesive product. Shear resistance, in particular, is sacrificed.

The use of chain transfer agents during polymerization reactions involved in the production of certain adhesive formulations (or precursors thereto) is known, for example, from U.S. Pat. Nos. 4,316,830, 4,140,668, 4,128,518, 3,923,752 and 3,920,600. Use of such agents to control molecular weight is disclosed in U.S. Pat. Nos. 4,810,523, 4,702,496, 4,608,111, 4,322,472 and 4,230,772.

U.S. Pat. No. 4,305,996 relates to adhesives made from hydroxyl-containing liquid polymers. A mercaptan compound is used as a chain transfer agent during preparation of polymers.

U.S. Pat. No. 4,665,127 discloses pressure sensitive adhesive compositions which include polymers with reactive silicon-containing groups.

U.S. Pat. No. 4,042,554 relates to preparation of mastic adhesives, noting that a larger amount of chain transfer agent is needed for some purposes.

U.S. Pat. Nos. 4,005,247 and 3,769,254 relate to preparation of pressure sensitive adhesives by reacting certain acrylic interpolymers with certain metal alkoxides.

U.S. Pat. No. 3,532,708 relates to room temperature crosslinkable pressure sensitive adhesives prepared in an organic solvent and a metal alkoxide.

U.S. Pat. Nos. 3,707,518 and 3,617,362 relate to self crosslinking pressure sensitive adhesives comprising alkoxy silyl crosslinking monomers.

European Patent Publication No. 0 183 495 relates to alkyl acrylate pressure sensitive adhesive compositions containing organosilane additives.

Methyl acrylamidoglycolate methyl ether (MAGME ® 100 available from Cyanamid, Wayne, N.J.; See Cyanamid's brochure: "MAGME 100 Multi-Functional Acrylic Monomer") as a co-monomer in acrylic coatings is disclosed, for example, by U.S. Pat. No. 4,454,301. According to a technical bulletin, (American Cyanamid—"Chemistry & Coatings Applications of MAGME ® 100 Crosslinkable Monomer"), both the methyl ester and methyl ether groups in MAGME ® monomer undergo acid catalyzed reaction with alcohols. The monomer is also believed to undergo self-condensation It is believed that acid catalysis promotes the crosslinking reaction, and that a strong acid promotes increased crosslinking.

For purposes of pressure sensitive adhesive products, strong acid catalysts are usually to be avoided. Use of strong acid catalysts, at levels up to 3% on weight of total resin solids, carries with it the risk of impaired or shortened shelf life, and for this reason, is not well-suited for a commercially useful acrylic pressure sensitive adhesive.

SUMMARY OF THE INVENTION

It is an object of the present invention to provide a solvent-based pressure-sensitive adhesive composition having high solids content together with coatable viscosity and superior physical properties in use, such as shear strength, peel resistance, tackiness and the like.

It is another object of the invention to provide solvent based pressure sensitive adhesive compositions having lower viscosities at a given solids level than were achievable by prior art products, without significantly sacrificing shear or peel resistance or other desirable physical properties.

It is another object of the invention to provide cost-efficient, low-solvent, adhesive formulations which are easy to transport and cure without raising the degree of environmental protection concerns which accompany higher solvent formulations.

It is another object of the invention to provide adhesive products which are storage-stable and which maintain coatable viscosity over time.

It is another object of the invention to provide adhesives capable of demonstrating heat-resistance, and of providing good shear strength even at high temperatures.

It is another object of the invention to provide novel methods of manufacturing adhesive formulations wherein undesirable premature crosslinking of polymer is repressed during manufacture and storage.

It is another object of the invention to provide a novel pressure sensitive adhesive composition including an interpolymer containing alkyl acrylamidoglycolate alkyl ether which does not require strong acid catalysis for crosslinking.

These and other objects are accomplished by providing the pressure-sensitive adhesive compositions disclosed herein, and by providing novel manufacturing processes as disclosed herein.

In one aspect of the invention, a pressure-sensitive adhesive composition is provided which comprises:

(a) a solvent; and (b) alkyl acrylate-containing interpolymers having an average glass transition temperature of less than $-10°$ C., at least some of said interpolymers having had polymerized into their molecules an internal crosslinking monomer capable of forming a direct covalent bond to an adjacent polymeric segment (for example another interpolymer other than the interpolymer into which said internal crosslinking monomer has been polymerized, or to another position on the same interpolymer);

wherein said interpolymers are formed in a polymerization reaction during which a delayed reactant mixture comprising more than 7% of a chain transfer solvent (by weight of polymerizable materials in said delayed mixture) is present, in whole or in part, for a period greater than 20% of the total reaction time, and wherein the total amount of chain transfer solvent charged to the reactor before polymerization is terminated exceeds 7% (by total weight of polymerizable material used during polymerization).

In another embodiment, a pressure-sensitive adhesive composition comprises:

(a) a solvent; and (b) interpolymers comprising at least 40% (by weight of the interpolymer) of alkyl acrylate monomers, at least some of said interpolymers having had polymerized into their molecules an internal crosslinking monomer capable of forming a direct covalent bond to an adjacent polymeric segment;

wherein solids of said adhesive composition have a Williams Plasticity Number (measured in the absence of external crosslinking agents) of less than 1.8.

In another embodiment, a pressure-sensitive adhesive composition comprises:

an interpolymer in solution, and an external crosslinking agent, said interpolymer including in its molecular structure alkyl acrylate, an internal crosslinking monomer which has been polymerized into said interpolymer, and an acrylic monomer having at least one hydrogen atom which is sufficiently reactive to allow said acrylic monomer to bind said external crosslinking agent when said acrylic monomer is contacted with said external crosslinking agent, said interpolymer having (prior to addition of external crosslinking agents) a Williams Plasticity number of 0.35 to 1.8.

In one aspect of the invention, applicants have discovered certain internal crosslinking monomers particularly useful in pressure-sensitive adhesive compositions, as well as novel combinations of internal crosslinking monomers. In one embodiment, two internal crosslinking monomers of different reactivity are utilized. One preferred group of internal crosslinking monomers for use by itself, or in combination with another internal crosslinking monomer, are the alkyl acrylamidoglycolate alkyl ethers.

Novel methods for manufacturing pressure-sensitive adhesive compositions in accordance with the invention include the steps of (a) charging to a reactor a mixture of monomers which include an alkyl acrylate and an internal crosslinking monomer, said internal crosslinking monomer having a polymerizable double bond and a functionality capable of covalently bonding to an adjacent polymeric segment;

(b) initiating a polymerization reaction;

(c) charging to said reactor, during said polymerization reaction, a delayed reactant mixture comprising at least 7% (on weight of polymerizable material in said mixture) of a solvent with enhanced chain transfer properties; and (d) terminating said polymerization reaction;

wherein said delayed reactant mixture is present in said reactor, in whole or in part, for a time period greater than 20% of the total time during which said polymerization reaction proceeds, and wherein the total amount of chain transfer solvent charged to the reactor before polymerization is terminated exceeds 7% (by total weight of polymerizable material used during polymerization).

In some embodiments where the initial charge includes at least 2% of a chain transfer solvent, and preferably at least 7% (by weight of polymerizable material), delayed addition of mixtures with a high concentration of chain stoppers may be omitted.

In certain embodiments, the present invention provides a pressure sensitive adhesive formulation comprising an interpolymer in solution, wherein the interpolymer comprises a first internal crosslinking monomer which is an alkyl acrylamidoglycolate alkyl ether and a second internal crosslinking monomer more reactive than the first (e.g. an alkoxy silane monomer). Such a formulation has less need for strong acid catalysis than is usual in order to crosslink interpolymers containing the alkyl acrylamidoglycolate alkyl ether monomer.

Adhesive formulations in accordance with the invention may be coated onto a substrate and dried in a conventional heat-drying process (the "curing" step), to provide adhesive products which exhibit, after curing, exceptional shear strength, tackiness and other desirable adhesive qualities, including good heat resistance.

As used herein the term "interpolymer" includes a polymeric chain comprised of two or more monomers wherein the polymeric chain is capable of crosslinking with another such chain through an external crosslinking agent activated by solvent removal. Interpolymers of the invention may also self crosslink through functionalities of their internal crosslinking monomers.

As used herein, an "internal crosslinking monomer" includes any monomer which is polymerized into an interpolymer and which includes functional side chains capable of establishing direct covalent bonds to an interpolymer chain other than the one in which it is incorporated. Such internal crosslinking monomers include but are not limited to alkoxides of a central atom which central atom is further substituted by a polymerizable double bond (e.g., a methacrylyl function), alkyl acrylamidoglycolate alkyl ethers, and crosslinking methacrylates and methacrylamides.

As used herein, an "external crosslinking agent" includes any agent which is not polymerized into an interpolymer chain, but which is capable of crosslinking two or more interpolymer chains.

Except where otherwise specified, "Williams Plasticity" or "Williams Plasticity Number" or "Plasticity Number", as used herein, is the value obtained by testing the solids of the formulations of the invention in accordance with standard testing procedures set forth at ASTM standard D-926-83, after preparing the solids to be tested as follows. A film of solvent-containing formulations (sufficient to dry to about 2 millimeters thickness) is cast onto release paper, air dried for five minutes, then exposed to heat at 212° F. for five minutes. The resulting film is formed into a substantially spherical ball having a mass of about 2 grams. The ball is conditioned at 100° F. for 15 minutes, together with a plastometer (Scott Model P4) which has also been conditioned at 100° F. The ball is placed between plates of the plastometer and measurements taken by standard techniques (see ASTM D-926-83). Unless otherwise specified, Williams Plasticity Numbers are determined in the absence of external crosslinking agents as defined herein, although interpolymers having certain Williams Plasticity Numbers (determined in the absence of external crosslinking agents) are often used together with external crosslinking agents in the adhesive compositions of the invention.

The interpolymers used in the adhesive compositions of the invention are preferably formed in a polymerization reaction which proceeds under conditions which limit chain growth and result in an interpolymer having a Williams Plasticity Number of less than 1.8. Plasticities preferably are below 1.5, and in some preferred embodiments, below 1.2. Plasticities are preferably above 0.35, and more preferably above 0.4, e.g. 0.5.

Preferred polymerization conditions for preparing the interpolymer include the use of at least 2% of a solvent with good chain transfer properties. Preferably, at least 7% chain transfer solvent is present at all times. A delayed reactant mixture which includes at least 7% chain transfer solvent (on weight of polymerizable material in the delayed reactant mixture), and more preferably, as high as 10% or 15% may be added as the polymerization reaction proceeds. This delayed reactant mixture is preferably present, in whole or in part, for at least 20% and preferably at least 50% of the total polymerization reaction time. The delayed reactant mixture desirably brings the total amount of chain transfer solvent introduced into the reactor (on weight of total polymerizable materials introduced) to at least 7% (and preferably at least 10% or even 13%) before the reaction is terminated.

When hydroxylic solvents or other chain transfer agents are available to inhibit chain growth during preparation of the interpolymer of the invention, they are additionally believed to repress undesirable premature crosslinking, especially by any internal crosslinking monomers which are part of the growing interpolymer chain. Such crosslinking is desirably avoided during manufacture and storage of the adhesive formulations of the invention, and desirably occurs only during heat curing of the adhesive after it has been applied to a suitable substrate during preparation of an adhesive product such as an adhesive tape. It is at this later stage, after viscosity has ceased to be a concern, that desirable crosslinking occurs. It is believed that adhesive properties of the final product are substantially enhanced by this crosslinking.

Applicant has surprisingly found that adhesives prepared in accordance with the present invention, when dry, display markedly improved adhesive properties, particularly shear resistance. When internal crosslinking monomers such as alkoxy silanes or acrylamidoglycolates are incorporated into the interpolymer chain with plasticity values so low that usefulness as a commercial adhesive would not have been expected, shear resistance is unexpectedly high.

The adhesive formulations of the invention may further include organic solvents and crosslinking agents activated by solvent removal under ambient conditions. High solids content, for example in excess of 58% by weight, and preferably in excess of 60% or even 65%, by weight, (corresponding to solvent concentrations below 42%, 40% an 35%, respectively) are obtainable while maintaining good adhesive characteristics. Even at high solids contents, the adhesive compositions may exhibit a viscosity suitable for coating onto a substrate, e.g., a viscosity below 10,000 centipoise.

DETAILED DESCRIPTION OF THE PREFERRED EMBODIMENTS

In order to manufacture novel adhesive formulations in accordance with the invention, the interpolymer is preferably formed from monomers with both high and low glass transition temperatures which are selected in accordance with known techniques to yield interpolymers with glass transitions temperatures below $-10°$ C. and preferably below $-25°$ C. Desirably, a substantial portion of the monomers used (e.g., 40% or more on weight of polymerizable material) are alkyl acrylates. In preferred embodiments, the alkyl groups in such alkyl acrylates have from about 1 to 18 carbon atoms, preferably 4-10. Preferred alkyl acrylate monomers include but are not limited to methyl acrylate, ethyl acrylate, isopropyl acrylate, n-butyl acrylate, isobutyl acrylate, and methyl or ethyl alkyl acrylates such as 2-ethylhexyl acrylate and normal octyl acrylate. Monomers which are not esters of acrylic acid, and which are monofunctional, are also useful monomers for preparing the interpolymer. Examples of such monomers include, but are not limited to, vinyl acetate, vinyl propionate, styrene, maleic acid diesters, fumaric acid diesters, ethylene and vinyl chloride.

In preferred embodiments, proton-donating monomers are also included to provide reactive hydrogen atoms and sites for subsequent crosslinking, especially through external crosslinking agents which are desirably included in the final pressure-sensitive adhesive composition. Preferred monomers for imparting this functionality include monomers having at least one hydrogen atom which is sufficiently reactive to allow said monomer to bind external crosslinking agents with which they are contacted. Such monomers include but are not limited to acrylic acid, methacrylic acid, maleic anhydride, fumaric acid, maleic acid half-esters, itaconic acid and crotonic acid. Both hydroxyl and carboxyl monomers are preferred, especially at levels less than 15%, on weight of monomers. Levels above 1%, especially from about 3%–7% are believed most desirable. Useful hydroxylic monomers include, but are not limited to hydroxyethyl acrylate, hydroxypropyl acrylate, hydroxyethyl methacrylate and hydroxypropyl methacrylate.

The monomers are preferably dissolved in a mixture of organic solvents suitable as a polymerization medium. Useful solvents include but are not limited to toluene, xylene, ethyl acetate, n-propyl acetate, isopropanol, acetone, methyl acetate, hexane and heptane. The amount of solvent blend used for the initial charge varies across a wide range, but preferred solvent contents, prior to initiation, range from about 10% to about 65%, on total weight of materials charged to the reactor. It should be noted that the lower alcohols are effective chain transfer agents and this aspect of their performance characteristics is important in determining their level of use as described in more detail below regarding chain transfer agents.

An internal crosslinking monomer may be charged to the reactor initially, or added to the reaction mass over an extended period. The level of internal crosslinking monomer used may range from 0.01 to 20.00%, on weight of monomer charge, but preferably is 0.05 to 5.00%. Among the useful internal crosslinking monomers are alkoxides of a central atom which are further substituted with a polymerizable methacrylyl function. The central atom is preferably selected from Groups II, III or IV of the periodic table, and/or is a metal. Suitable internal crosslinking monomers include, but are not limited to, methacryloxyalkyl silanes having at least one alkoxy group such as a methoxy or ethoxy group. Preferred silanes include but are not limited to a 3-methacryloxypropyltrimethoxy silane and gamma-methacryloxypropyl-tris-(beta-methoxyethoxy) silane.

Other useful internal crosslinking monomers include alkyl acrylamidoglycolate alkyl ethers, such as methyl acrylamidoglycolate alkyl ether monomer (MAG-ME®, available from American Cyanamid Company, Polymer Products Division, One Cyanamid Plaza, Wayne, N.J. 07470). This monomer provides reactive sites on the interpolymer for internal crosslinking. The monomer has the general structure:

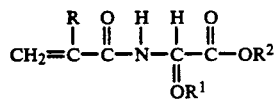

wherein R is hydrogen or methyl, $R^1$ is selected from alkyls of 1-6 carbon atoms and cycloalkyls of 5-6 carbon atoms, $R^2$ is selected from alkyls of 1-6 carbon atoms and cycloalkyls of 5-6 carbon atoms, each of which is optionally substituted with oxygen or nitrogen heteroatoms.

Other useful internal crosslinking monomers include but are not limited to acetoacetoxyalkyl methacrylates and isoalkoxy methacrylamides.

Applicants have discovered that acrylic copolymers containing alkyl acrylamidoglycolate alkyl ether can be crosslinked to achieve high levels of performance in the absence of strong acid catalysts and at relatively low curing temperatures. Combinations of internal crosslinking monomers having different reactivity have been found to be especially useful. A low level of a more reactive crosslinking monomer which also cures by self-condensation or by condensation with other moieties containing hydroxyl groups may be used, for example, together with alkyl acrylamidoglycolate alkyl ether. When such additional monomer is used, low levels of carboxylic monomer-acids which are too weak to catalyze condensation of the alkyl acrylamidoglycolate alkyl ether, but which are strong enough to promote the condensation of the more reactive monomer are preferably employed. Without wishing to be bound by theory, it is believed that the more reactive monomer, in the process of condensation, initiates condensation of the alkyl acrylamidoglycolate alkyl ether component.

Preferably, the alkyl acrylamidoglycolate alkyl ether and more reactive crosslinking monomer comprise from about 0.25% to about 20.0%, on weight of the monomers, most preferably between about 0.5% and about 5.0%. The ratio of alkyl acrylamidoglycolate alkyl ether monomer to more reactive monomer is from about 0.1/1.0 to about 40.0/1.0, preferably from about 1.0/1.0 to about 20.0/1.0.

A suitable more reactive monomer is a polymerizable alkoxy silane (or an alkoxide of another central atom as discussed above), e.g., gamma-methacryloxypropyl trimethoxysilane, for example, organo-functional silane A-174, available from Union Carbide. Other monomers may also be utilized.

Solvents having chain transfer properties such as hydroxylic chain-transfer agents are preferably present during preparation of the interpolymer of the invention to prevent gellation during processing, to increase shelf life of the adhesive formulation, and, of course, to control the molecular weight of the growing interpolymer. Williams Plasticity of the interpolymer alone (e.g. without external crosslinking agents) is preferably below 1.8 and preferably above 0.35. Preferred ranges are from 0.4-1.5, and especially from 0.5 to 1.2. As indicated above, the lower alcohols (methanol, ethanol, isopropanol, n-propanol) are effective chain transfer agents, as are analogous mercaptans and the like. Keto compounds which readily undergo enol conversion are also useful. Some useful chain transfer solvents include but are not limited to acetoacetic esters and acetyl acetone (2.4-pentanedione). Combinations of chain transfer agents (e.g. isopropanol and acetyl acetone) may be used. It is believed that isopropyl alcohol may enhance the chain-transfer ability of acetyl acetone, perhaps by pushing the enol-keto equilibrium of acetyl acetone in the enol direction.

It is preferred that the amount of chain transfer agent present during preparation of the interpolymer should initially exceed 2% by weight of polymerizable materials, and that is should increase to at least about 7% and preferably over 10% or 13% before termination of polymerization. This is best accomplished by introducing delayed reactants with at least 7% and preferably over 10% or 15% chain transfer solvent, during at least 20% and preferably during a majority of the total polymerization time.

The initial charge is heated to reflux. Reflux temperature varies with solvents and monomers selected and is preferably about 70° C. to about 100° C. Then, internal crosslinking monomer is preferably added substantially simultaneously with addition of an initial catalyst solution. The initial catalyst may be any species capable of initiating copolymerization of the monomers initially charged and include but are not limited to t-butyl-peroxy-2-ethyl hexanoate, t-butylperoxy-pivalate, t-amylperoxy-2-ethyl hexanoate, benzoyl peroxide and such other initiators as have half-lives of about 0.5 to 2.0 hours at 70° C. to 100° C. Preferably, both the initial catalyst and internal monomer are dissolved in a solvent such as ethyl acetate before being charged into the reaction vessel.

Between about 30 minutes and 2 hours after initiation, additional internal crosslinking monomers may be added, preferably just prior to the start of an extended addition of a second monomer solution. The time period of the extended addition of second monomer solution preferably varies between 2 to 5 hours.

After completion of the delayed additions, reflux is preferably maintained for several hours until all monomer is used up. The total time for the entire polymerization reaction described above is preferably between about 5 hours and 8 hours.

The delayed catalyst solution preferably includes a sufficiently high concentration of solvents with enhanced chain transfer properties to ensure stability during processing. An insufficiency of chain transfer agents can result in gellation during processing. A transfer agent to internal crosslinking monomer ratio of from 12:1 to 180:1 is preferable, and desirably from 20:1 to 100:1.

After reflux is terminated, the reaction mix is allowed to cool. Following cooling, an external crosslinking agent is optionally added together with additional solvents to maintain coatable viscosity below about 10,000 centipoise. An external crosslinking agent capable of being activated by solvent removal is added in an amount sufficient to raise the Williams Plasticity Number of the solids to between about 1.7 and 4.0 depending upon the desired final use of the resulting adhesive composition. Raising Williams Plasticity is believed to favor shear resistance, while a lower plasticity is believed to favor peel resistance. Preferred external crosslinking agents include metal alkoxides which may have alkyl or other substituents on the central metal atom in addition to the alkoxide substituents. Preferred metals of the central atom include but are not limited to aluminum, nickel and calcium. Resinous cross linkers such as urea resins and/or melamine resins are also useful. Examples of external crosslinking agents useful in accordance with the invention are magnesium isopropoxide, titanic acid esters, zirconium or aluminum acetyl acetonate, titanium isopropoxide, ferric isopropoxide, diisopropoxy titanium acetylacetone and chelated aluminum esters in which the chelating agent is acetylacetonate.

The total solids content of the final product is preferably at least 58% by weight. Adhesives formulated in accordance with the invention are believed to exhibit lower viscosity then prior art adhesive compositions at given solids concentrations, especially in excess of 58%, while maintaining good shear and peel, tack, etc. As set forth in more detail in the examples below, tests have been conducted by which compounded formulations of the invention are coated onto substrates and heat dried conventionally to produce adhesive products exhibiting excellent peel resistance and good resistance to shear at both room temperature and elevated temperatures.

Certain adhesive compositions, for example those employing primarily MAGME as internal crosslinkers display good storage stability and a reduced need for added stabilizers such as acetyl acetone during storage. Such stabilizers may undesirably slow subsequent curing of the adhesive, or form discoloring iron chelates with iron from their storage container. Accordingly, the ability to reduce or eliminate stabilizers is desirable.

EXAMPLE 1

An initial charge is prepared by thoroughly intermixing in a reaction vessel the following components in the amounts shown:
   2-ethylhexylacrylate: 297.2 grams
   isobutylacrylate: 93.7 grams
   vinyl acetate: 121.4 grams
   acrylic acid: 25.7 grams
   maleic anhydride: 1.0 grams
   isopropyl alcohol: 20.0 grams
   ethyl acetate: 129.0 grams
   toluene: 50.0 grams
   heptane: 180.0 grams Separately an initial catalyst solution was prepared containing 0.75 grams of t-butyl peroxy-2-ethyl hexanoate, 0.75 grams of odorless mineral spirits, 10 grams of ethyl acetate and a silane crosslinking monomer solution was prepared containing 4.5 grams of 3-methylacryloxypropyltrimethoxy-silane in 10.0 grams of ethyl acetate. The initial charge was heated to reflux, after which the initial catalyst solution and 7 grams of the silane monomer solution were added. Approximately 45 minutes after initiation, the balance of the silane monomer solution was added followed immediately by a gradual feeding of delayed monomers and delayed catalyst over a period of 4 hours.

The delayed monomers were as follows:
   2-ethylhexylacrylate: 491.0 grams
   isobutylacrylate: 151.0 grams
   vinyl acetate: 88.2 grams
   acrylic acid: 41.8 grams
   isopropyl alcohol: 80.0 grams The delayed catalyst solution was formulated as follows:
   T-butyl peroxy-2-ethyl hexanoate: 75 grams
   odorless mineral spirits: 0.75 grams
   benzoyl peroxide: 3.8 grams
   isopropyl alcohol: 200 grams
   acetyl acetone: 10 grams
   toluene: 20 grams Reflux was maintained for 3 hours after all of the delayed monomers and delayed catalysts were charged. The reaction mixture upon cooling had a viscosity of 3350 cps, a Williams Plasticity Number of 0.55 and solids content of 61.36%. Sufficient aluminum acetylacetonate in toluene solution, was added to increase the Williams Plasticity to 2.55. A fourth of a percent, on total weight, of acetyl acetone was added to ensure additional stability. The viscosity of the compounded adhesive was observed to be 3200 centipoise at 60% solids.

EXAMPLE 2

A film of the adhesive solution of Example 1, 1 mil dry thickness, was applied to a polyester substrate. The solvents were heat evaporated, leaving a dried, crosslinked adhesive tape product A strip of this product was cut and placed onto a standard stainless steel plate such that it overlapped the plate by an area of one square inch. A roller was used to press the adhesive-coated strip against the standard plate. After 15 minutes a weight of 4 lbs. was placed on the strip. The strip resisted shear failure for a period of 116.2 hours at room temperature.

EXAMPLE 3

The formulation of Example 1 was tested in accordance with the technique of Example 2, with the exception that a one pound weight was used instead of a four pound weight, and shear was tested at an elevated temperature of 300° F. Shear resistance was still being maintained after 100 hours at which time the test was discontinued.

EXAMPLE 4

The adhesive formulation produced in Example 1 was coated (in an amount sufficient to leave a dry film thickness of one one-thousandth of an inch upon solvent evaporation) onto a polyester substrate 1 inch wide and approximately 10 inches in length, and heat dried. A five inch portion of the specimen was applied, adhesive side down, to the longitudinal surface of a stainless steel test panel. After 15 minutes of dwell time, a free end of the tape was doubled back at an angle of 180° and one inch of the tape was peeled from the panel at the folded end. The free portion of the panel was clamped into the upper jaw of the tester with the tab area of the tape clamped in the lower jaw. Testing was commenced at a uniform jaw separation rate of 12 inches per minute. The first half inch of the test was disregarded. The average scale value obtained for 2 inches of mechanical peel was observed to be 3.6 lbs. in one test, and 3.8 lbs. in a second test of the same adhesive.

EXAMPLE 5

The adhesive formulation produced in Example 1 was coated onto a polyester substrate and heat-dried. The sample was then tested with a Polyken Probe Tack Tester, Model 480-2, Series 400. A six-inch strip (adhesive side up) was placed on the bench of the tester. A 20 gram annular weight (100 g/cm$^2$) was placed on the adhesive. The combination of annular weight and tape was placed in the carrier well of the Tack Tester. When the test button of the previously zeroed tack tester was depressed, a tack value of 493 g/cm$^2$ was obtained from the digital readout.

EXAMPLE 6

This example illustrates the use of MAGME monomer in high solids, solution-based polyacrylic pressure sensitive adhesive.

A mixture of monomers was prepared as follows:
2-ethylhexyl acrylate: 264.7 g
n-butyl acrylate: 141.0
acrylic acid: 25.5
ethyl acetate: 288.0
heptane: 129.5
acetone: 50.5
MAGME: 5.8

Separately, an initial catalyst solution was prepared containing 1.4 grams of 2,2 azobis (2-methyl propanenitrile) and 20 grams of ethyl acetate. The initial charge was heated to reflux after which ¼ of the initial catalyst solution was charged to the reactor. Approximately 75 minutes after initiation, the balance of the initial catalyst solution, and an intermediate monomer were charged to the reactor over a 15 minute period.

INTERMEDIATE MONOMER MIXTURE 2-ethylhexyl acrylate: 114.5 g
n-butyl acrylate: 62.0
acrylic acid: 10.8

A reflux temperature was maintained for 1 hour following the above additions, followed immediately by the extended addition of a delayed monomer solution and a delayed catalyst solution.

DELAYED MONOMER SOLUTION 2-ethylhexyl acrylate: 569.0 g
n-butyl acrylate: 520.0
acrylic acid: 50.5
isopropyl alcohol: 58.0

DELAYED MONOMER SOLUTION

Add half of the delayed monomer solution over 2 hours. Add the remaining half over 1 hour.

DELAYED CATALYST SOLUTION 2,2-azobis (2-methylpropanenitrile): 1.5 g
benzoyl peroxide: 5.0
isopropyl alcohol: 79.0
acetyl acetone: 43.0

PROCEDURE FOR CATALYST SOLUTION

Add the delayed catalyst solution over 3 hours.

Reflux was maintained for 2¼ hours after the extended additions had been completed.

The batch was then cooled to 35 C. and 44 grams of isopropyl alcohol were added.

The resulting resin solution had a viscosity of 18000 cps, a Williams Plasticity number of 0.53 mm and a non-volatile content of 71.33%.

The base resin was utilized to prepare a compounded adhesive by adding 30 grams of 10% aluminum acetylacetonate in toluene to 352 grams of the base resin. The solids content of the resulting adhesive compound was 66.5%, the Williams Plasticity number was 0.53 mm and viscosity was 8500 cps.

EXAMPLE 7

A film of the adhesive solution of Example 6, 1 mil dry thickness, was applied to a polyester substrate. The solvents were heat evaporated, leaving a dried, cross-linked adhesive tape product. A strip of this product was cut and placed onto a stainless steel test panel such that it overlapped the panel by an area of one square inch. A five pound rubber coated steel roller was passed back and forth five times over the region of overlap to press the adhesive coated strip against the standard panel. After 15 minutes, a weight of 4 pounds was placed on the strip. The strip resisted shear failure for a period of 154 hours.

EXAMPLE 8

Measurement of Peel Resistance at Room Temperature

The adhesive formulation produced in Example 6 was applied to a polyester substrate approximately 1 inch wide and 10 inches long, and heat dried. A five inch portion of the specimen was applied, adhesive side down, to the longitudinal surface of a standard steel test pane. A five pound rubber coated steel roller was passed back and forth over the strip five times to press the adhesive control stop against the test plate. After 15 minutes, a free end of the tape was doubled back at an angle of 180° and one inch of the tape was peeled at the folded end.

The free portion of the panel was clamped into the upper jaw of a Model X3 peel tester manufactured by Scott Testers Industries, Inc. of Providence, R.I., with the tab area of the tape clamped in the lower jaw. Testing was commenced at a uniform jaw separation rate of 12 inches per minute. The first half inch of the test was disregarded. The average value obtained for peel resistance was observed to be 3.8 pounds.

EXAMPLE 9

The following example illustrates the combination of MAGME ® monomer and a more reactive crosslinking monomer. A first resin (Resin A) not containing a more reactive crosslinking monomer was prepared, and a second resin (Resin B) which included the more reactive crosslinking monomer gamma-methacryloxypropyl trimethoxysilane (Union Carbide Organo-Functional Silane-174), was also prepared.

Preparation of Resin A

An initial charge was prepared by thoroughly intermixing in a reaction vessel the following components, in the amounts shown:
2-ethylhexylacrylate: 297.2 grams
isobutyl acrylate: 93.7 grams
vinyl acetate: 121.4 grams
acrylic acid: 25.7 grams
maleic anhydride: 1 0 grams
isopropyl alcohol: 10.0 grams
ethyl acetate: 145.0 grams
toluene: 50.0 grams
heptane: 200.0 grams Separately an initial catalyst solution was prepared containing 0.75 grams of t-butyl peroxy-2-ethylhexanoate, 0.75 grams of odorless mineral spirits and 10 grams of ethyl acetate.

A crosslinker solution was also prepared, containing 15.3% solution of MAGME ® 100 in ethyl acetate. The total weight of the solution was 75 grams.

The initial charge was heated to reflux, and the initial catalyst solution was added. Immediately afterwards, 25 grams of the crosslinker solution was added. Approximately 45 minutes after initiation, the remaining 50 grams of crosslinker solution was added, followed immediately by a gradual feeding of delayed monomers and delayed catalyst solution over a period of four hours.

The delayed monomers were as follows:
2-ethylhexylacrylate: 491.0 grams
isobutylacrylate: 151.0 grams
vinyl acetate: 88.2 grams
acrylic acid: 41.8 grams
isopropyl alcohol: 60.0 grams The delayed catalyst solution was formulated as follows:
odorless mineral spirits: 0.3 grams
benzoyl peroxide: 3.6 grams
acetyl acetone: 10.0 grams
isopropyl alcohol: 120.0 grams
toluene: 20.0 grams Reflux was maintained for 2½ hours after all of the delayed monomers and delayed catalysts were charged. The reaction mixture upon cooling was diluted with 100 grams of isopropyl alcohol.

The final product had a viscosity of 4000 cps, a nonvolatile content of 60.75% and a plasticity number of 0.635 mm. The product was designated Resin Solution A.

Preparation of Resin B

An initial charge was prepared by thoroughly intermixing in a reaction vessel the following components, in the amounts shown:
2-ethylhexylacrylate: 297.2 grams
isobutyl acrylate: 93.7 grams
vinyl acetate: 121.4 grams
acrylic acid: 25.7 grams
maleic anhydride: 1.0 grams
isopropyl alcohol: 45.0 grams
heptane: 150.0 grams
toluene: 40.0 grams
ethyl acetate: 145.0 grams Separately an initial catalyst solution was prepared containing 1.1 grams to t-butyl peroxy-2-ethyl-hexanoate and 1.1 grams of odorless mineral spirits. An initial crosslinker solution was also prepared consisting of 25 grams of a 15.3% solution of MAGME ® 100 in ethyl acetate and 1.7 grams of Organofunctional Silane A-174.

The initial charge was heated to reflux, and the initial catalyst solution was added, followed immediately by the initial crosslinker solution.

Approximately 45 minutes after initiation, an intermediate crosslinker solution consisting of 50 grams of 15.3% MAGME ® 100 solution in ethyl acetate, diluted with 20 grams of isopropyl alcohol was added to the reactor. Immediately thereafter, the extended addition of a delayed monomer solution and a delayed catalyst solution were begun. Time of addition for each solution was four hours.

The delayed monomers were as follows:
2-ethylhexylacrylate: 491.0 grams
isobutyl acrylate: 151.0 grams
vinyl acetate: 88.2 grams
acrylic acid: 41.8 grams
isopropyl alcohol: 80.0 grams The delayed catalyst solution was formulated as follows:
t-butyl peroxy2-ethylhexanoate: 0.3 grams
odorless mineral spirits: 0.3 grams
isopropyl alcohol: 120.0 grams
acetyl acetone: 10.0 grams
toluene: 20.0 grams Reflux was maintained for three hours after all of the delayed monomer solution and the delayed catalyst solution had been added.

The finished product was cooled and 70 grams of isopropyl alcohol was added.

The resulting resin solution, designated Resin Solution B, had a viscosity of 1600 cps, a plasticity number of 0.72 mm and a nonvolatile content of 61.4%.

Resins A and B were evaluated for their adhesive properties in uncompounded form. Resin characteristics and comparison results are shown in Table 1.

TABLE 1

| | Resin A | Resin A + 2 PTSA* | Resin B |
| --- | --- | --- | --- |
| Viscosity | 4000 cps | 5000 cps | 1600 cps |
| Non Volatile | 60.75% | 59.2% | 61.4% |
| Plasticity No. | 0.635 mm | 0.72 mm | 0.72 mm |
| Shear Resistance (Room Temp) | 4 mins. | 6 mins. | 97 mins. |
| Peel Resistance | 10+ psi | 10+ psi | 9.7 psi |
| Polyken Tack | 1666 gm/cm | 1635 gm/cm | 1468 gm/cm |

*Para-toluene sulfonic acid (as a 8% solution in toluene/isopropanol (4/1)) added until there is 2% PTSA on weight of resin solids.

The three resin solutions were applied to give dry film thickness of 3 mils The wet films were allowed to air dry for 5 minutes and cured at 212° F. for 7 minutes.

As shown in Table 1, shear resistance of resin B was substantially greater than for each of the other two test films This result, plus the slightly lower tack and peel resistance of Resin B, is consistent with the conclusion that the presence of organofunctional Silane A-174 in Resin B unexpectedly promoted a higher degree of crosslinking of the MAGME ®100 component. This is especially significant in the comparison with the acid-catalyzed Resin A solution.

Monomer composition of Resin A and Resin B were as follows:

|  | Resin B | Resin A |
|---|---|---|
| 2-ethylhexyl acrylate | 59.52% | 59.61% |
| isobutyl acrylate | 18.48 | 18.51 |
| vinyl acetate | 15.83 | 15.85 |
| acrylic acid | 5.10 | 5.10 |
| maleic anhydride | 0.07 | 0.07 |
| MAGME ® 100 | 0.87 | 0.86 |
| A-174 | 0.13 | |
|  | 100.00% | 100.00% |

Preparation of Adhesive Based Upon Resin A with External Crosslinker Added

Sufficient aluminum acetylacetonate was added, as a 10% solution in toluene, to increase the plasticity number to 2.84. A film of 1 mil thickness (dry) was cast, air dried for 5 minutes and cured at 212° F. for five minutes. The resulting film exhibited excellent adhesive properties

| Peel resistance, psi, 13 mins./24 hrs. | 3.8/4.8 |
|---|---|
| Shear resistance, r.t., 1 inch by 1 inch, 4 lbs. | 91 hrs. |
| Shear resistance, 250° F., 1 inch by 1 inch, 250 g. | 120 hrs. |

Preparation of Adhesive Based Upon Resin B with External Crosslinker Added

Sufficient aluminum acetylacetonate was added, as a 10% solution in toluene, to increase the plasticity number to 3.01. The resulting film exhibited excellent adhesive properties:

| Peel resistance, psi, 15 mins./24 hrs | 2.9/3.5 |
|---|---|
| Shear resistance, room temp. 1 inch by 1 inch, 4 lbs. | 81 hrs. |
| Shear resistance, 250° F., 1 inch by 1 inch, 250 g. | 100+ hrs. |

EXAMPLE 10A

An initial charge is prepared by thoroughly mixing in a reaction vessel the following components in the amounts shown:
2-ethylhexyl acrylate: 198.7
butyl acrylate: 106
acrylic acid: 19
2-hydroxyethyl acrylate: 4
acetoacetoxyethyl methacrylate: 20
maleic anhydride: 2
ethyl acetate: 260
heptane: 125
acetone: 50

Separately an initial catalyst solution was prepared containing 0.6 grams 2,2'-azobis (2-methylpropanenitrile) in 15.0 grams of ethyl acetate. The initial charge was heated to reflux after which the initial catalyst solution was added. Approximately 75 minutes after the onset of polymerization, the simultaneous additions of an intermediate monomer mixture and an intermediate catalyst solution were started. These feed streams were added over 75 minutes. The intermediate monomer mixture was formulated as follows:
2-ethylhexyl acrylate: 200.5 gm
butyl acrylate: 112.0
acrylic acid: 18.0

The intermediate catalyst solution was formulated as follows:
benzoyl peroxide: 1.1 gm
toluene: 13.0

Reflux temperatures were maintained for 75 minutes following the completion of the intermediate additions at which time the simultaneous feeding of a delayed monomer mixture and a delayed catalyst solution were started. The delayed monomer mixture and its schedule of addition were as follows:
2-ethylhexyl acrylate: 549
butyl acrylate: 505
acrylic acid: 48
isopropyl alcohol: 50
TMI ®[1] (META) unsaturated aliphatic isocyanate: 6
[1] Trademark of American Cyanamid Company Half of the delayed monomer mixture was added over 2 hours. The remaining half was added over 1 hour. The delayed catalyst solution and its schedule of addition were as follows:
2, 2'-Azobis (2-methylpropanenitrile): 1.5 gm
benzoyl peroxide: 5.0
isopropyl alcohol: 120.0
toluene: 20
2,4 pentanedione: 20

The delayed catalyst solution was added at a uniform rate over 3 hours. After the two extended additions have been completed, reflux temperatures were maintained for a period of 2½ hours. Batch was then cooled and 25 gms of isopropyl alcohol were added. The reaction mixture, upon cooling, had a viscosity of 30,000 cps, a Williams Plasticity number of 0.51 mm. and a solids content of 71.52%.

EXAMPLE 10B

A sample of the resin prepared in example 10A was mixed with sufficient solution of aluminum acetyl acetonate, as well as isopropyl alcohol and toluene, to yield an adhesive with a solids content of 59.75 a viscosity of 7100 cps and a Plasticity number of 2.50%. This adhesive formulation was coated (in an amount sufficient to leave an adhesive film one one-thousandth of an inch in thickness after solvent evaporation) onto a polyester substrate 1 inch wide and approximately 10 inches long, and heat dried. A five inch portion of the specimen was applied, adhesive side down, to the longitudinal surface of a stainless steel test panel. After 15 minutes of dwell time, a free end of the tape was doubled back at an angle of 180° and one inch of the tape was peeled from the panel at the folded end. The free portion of the panel was clamped into the upper jaw of the tester with the tab area of the tape clamped in the lower jaw. Testing was commenced at a uniform jaw separation rate of 12 inches per minute. The first half inch of the test was disregarded. The average scale value obtained for 2 inches of mechanical peel was observed to be 2.3 lbs.

EXAMPLE 10C

A film of the adhesive solution of 10A, 2 mils dry thickness, was applied to a polyester substrate. The solvents were heat evaporated, leaving a dried, crosslinked adhesive tape product. A strip of this product was cut and placed onto a standard stainless steel plate such that it overlapped the plate by an area of one square inch. A roller was used to press the adhesive-coated strip against the standard plate. After 15 minutes a weight of 4 lbs. was placed on the strip. The strip resisted shear failure for a period in excess of 100 hours at room temperature.

EXAMPLE 11A

An initial charge is prepared by thoroughly mixing in a reaction vessel the following components in the amounts shown:
 2-ethylhexyl acrylate: 198.7
 butyl acrylate: 106
 acrylic acid: 19
 2-hydroxyethyl acrylate: 4
 CYLINK ®[2] isobutoxymethacrylamide: 10
 [2] Trademark, American Cyanamid Company
 ethyl acetate: 260
 heptane: 125
 acetone: 50
 maleic anhydride: 0.5

Separately an initial catalyst solution was prepared containing 0.6 grams of 2,2'-azobis (2-methylpropanenitrile) in 15.0 grams of ethyl acetate. The initial charge was heated to reflux after which the initial catalyst solution was added. Approximately 75 minutes after the onset of polymerization, the simultaneous additions of an intermediate monomer mixture and an intermediate catalyst solution were started. These feed streams were added over 75 minutes. The intermediate monomer mixture was formulated as follows:
 2-ethylhexyl acrylate: 200.5 gm
 butyl acrylate: 112.0
 acrylic acid: 18.0

The intermediate catalyst solution was formulated as follows:
 benzoyl peroxide: 1.1 gm
 toluene: 13.0

Reflux temperatures were maintained for 75 minutes following the completion of the intermediate additions at which time the simultaneous feeding of a delayed monomer mixture and a delayed catalyst solution were started. The delayed monomer mixture and its schedule of addition were as follows:
 2-ethylhexyl acrylate: 549
 butyl acrylate: 505
 acrylic acid: 48
 isopropyl alcohol: 50

Half of the delayed monomer mixture was added over 2 hours. The remaining half was added over 1 hour. The delayed catalyst solution and its schedule of addition were as follows:
 2,2'-Azobis (2-methylpropanenitrile): 1.5 gm
 benzoyl peroxide: 5.0
 isopropyl alcohol: 120.0
 2,4 pentanedione: 20
 toluene: 20

The delayed catalyst solution was added at a uniform rate over 3 hours. After the two extended additions have been completed, reflux temperature were maintained for a period of 2¼ hours. The batch was then cooled and 25 gms of isopropyl alcohol were added. The reaction mixture, upon cooling, had a viscosity of 19,000 cps, a plasticity value of 0.47 mm and a solids content of 73.08%.

EXAMPLE 11B

A sample of the resin prepared in example 11A was mixed with sufficient solution of alumiminum acetylacetonate, as well as isopropyl alcohol and toluene, to yield an adhesive with a solids content of 64.9%, a viscosity of 6300 cps and a plasticity number of 2.13 mm. This adhesive formulation was coated (in an amount sufficient to leave an adhesive film one one-thousandth of an inch after solvent evaporation) onto a polyester substrate 1 inch wide and approximately 10 inches long, and heat dried. A five inch portion of the specimen was applied, adhesive side down, to the longitudinal surface of a stainless steel test panel. After 15 minutes of dwell time, a free end of the tape was doubled back at an angle of 180° and one inch of the tape was peeled from the panel at the folded end. The free portion of the panel was clamped into the upper jaw of the tester with the tab area of the tape clamped in the lower jaw. Testing was commenced at a uniform jaw separation rate of 12 inches per minute. The first half inch of the test was disregarded. The average scale value obtained for 2 inches of mechanical peel was observed to be 2.4 lbs.

EXAMPLE 11C

A film of the adhesive solution of Example 11A, 2 mils dry thickness, was applied to a polyester substrate. The solvents were heat evaporated, leaving a dried, crosslinked adhesive tape product. A strip of this product was cut and placed onto a standard stainless steel plate such that it overlapped the plate by an area of one square inch. A roller was used to press the adhesive-coated strip against the standard plate. After 15 minutes a weight of 4 lbs was placed on the strip. The strip resisted shear failure for a period in excess of 100 hours at room temperature.

The terms and descriptions used herein are preferred embodiments set forth by way of illustration only, and are not intended as limitations on the many variations which those skilled in the art will recognize to be possible when practicing the present invention as defined by the following claims.

What is claimed is:

1. A pressure sensitive adhesive composition comprising:
 (a) an organic solvent; and
 (b) interpolymers having a glass transition temperature of less than −10° C. comprising at least 40% (by weight of the interpolymer) of alkyl acrylate monomers, at least some of said interpolymers having had polymerized into their molecules an internal crosslinking monomer having an ethylenically unsaturated group and a functionality which subsequently forms a direct covalent bond to an adjacent polymeric segment;
 wherein solids of said adhesive composition have a Williams Plasticity Number (measured in the absence of external crosslinking agents) of less than 1.2;
 wherein said interpolymers result from a polymerization reaction which includes addition of a delayed reactant mixture after initiation of polymerization, said mixture comprising additional acrylic monomers and more than 7% of a chain transfer solvent (by weight of polymerizable materials in said mixture), said delayed reactant mixture being present, in whole or in part, for a period greater than 20% of the total reaction time, and wherein the total amount of chain transfer solvent charged before polymerization is terminated exceeds 7% (by total weight of polymerizable material charged during polymerization).

2. The pressure-sensitive adhesive composition of claim 1, wherein said Williams Plasticity is 0.4–1.2.

3. The composition of claim 1, wherein said composition further comprises an external crosslinking agent and wherein said interpolymer further comprises a polymerizable proton-donating monomer having at least one hydrogen atom which is sufficiently reactive to allow said proton-donating monomer to bind said external crosslinking agent when said proton donating monomer is contacted with said external crosslinking agent.

4. The composition of claim 3, wherein said proton donating monomer is selected from the group consisting of acrylic acid, methacrylic acid, maleic anhydride, fumaric acid, maleic acid half-esters, itaconic acid, crotonic acid and mixtures of the foregoing, and wherein said external crosslinking agent is selected from the group consisting of aluminum acetylacetonate, melamine resin, urea resin and titanic acid ester.

5. The composition of claim 1, wherein said interpolymer includes two internal crosslinking monomers, one more reactive than the other.

6. A pressure-sensitive adhesive composition comprising interpolymers in organic solution, and an external crosslinking agent, said interpolymers having a glass transition temperature of less than −10° C. and derived from an alkyl acrylate in a concentration of at least 40% (by weight of the interpolymers) and further, an internal crosslinking monomer having an ethylenically unsaturated group and a functionality which subsequently forms a direct covalent bond to an adjacent polymeric segment and an acrylic monomer having at least one hydrogen atom which is sufficiently reactive to allow said acrylic monomer to bind said external crosslinking agent when said acrylic monomer is contacted with said external crosslinking agent, said interpolymers having (prior to addition of external crosslinking agents) a Williams Plasticity number of 0.35 to 1.2;
wherein said interpolymers results from a polymerization reaction which includes addition of a delayed reactant mixture after initiation of polymerization, said mixture comprising additional acrylic monomers and more than 7% of a chain transfer solvent (by weight of polymerizable materials in said mixture), said delayed reactant mixture being present, in whole or in part, for a period greater than 20% of the total reaction time, and wherein the total amount of chain transfer solvent charged before polymerization is terminated exceeds 7% (by total weight of polymerizable material charged during polymerization).

7. The composition of claim 6, wherein said interpolymer has a Williams Plasticity of 0.4–1.2.

8. The composition of claim 6, wherein said internal crosslinking monomer is an alkyl acrylamidoglycolate alkyl ether.

9. The composition of claim 8, wherein said interpolymer further includes an internal crosslinking monomer which is more reactive than said alkyl acrylamidoglycolate alkyl ether.

10. The composition of claim 9, wherein said more reactive internal crosslinking monomer is an alkoxide of a central atom which is further substituted with a polymerizable methacrylyl function.

11. The composition of claim 10, wherein said central atom is silicon.

12. A pressure sensitive adhesive composition comprising:
(a) an organic solvent; and
(b) alkyl acrylate-containing interpolymers having an average glass transition temperature of less than −10° C., at least some of said interpolymers having had polymerized into their molecules an internal crosslinking monomer having an ethylenically unsaturated group and a functionality which subsequently forms a direct covalent bond to another interpolymer other than the interpolymer into which said internal crosslinking monomer has been polymerized;
wherein said interpolymers are formed in a polymerization reaction which includes addition of a delayed reactant mixture after initiation of polymerization, said mixture comprising additional acrylic monomers and more than 7% of a chain transfer solvent (by weight of polymerizable materials in said mixture), is said delayed reactant mixture being present, in whole or in part, for a period greater than 20% of the total reaction time, and wherein the total amount of chain transfer solvent charged to the reactor before polymerization is terminated exceeds 7% (by total weight of polymerizable material used during polymerization).

13. The pressure-sensitive adhesive composition of claim 12, wherein said glass transition temperature is less than −25° C.

14. The pressure-sensitive adhesive composition of claim 12, wherein non-solids components of said adhesive composition are present at a concentration of less than 42% (by weight of said adhesive composition).

15. The composition according to claim 12, wherein said interpolymer is formed in a polymerization reaction which at all times proceeds in the presence of at least 2% by weight of a chain transfer solvent.

16. The composition of claim 12, wherein said delayed reactant mixture is present, in whole or in part, for a period of at least 50% of the total polymerization reaction time, wherein said mixture includes at least 15% (by weight of polymerizable material in said delayed reactant mixture) of a chain transfer solvent, and wherein the total amount of chain transfer solvent charged before polymerization terminates exceeds 10% (by total weight of polymerizable material used during polymerization).

17. The composition of claim 12, wherein said chain transfer solvent is selected from the group consisting of alcohols, mercaptans and keto compounds capable of undergoing enol conversion.

18. The composition of claim 17, wherein said chain transfer solvent is a combination of isopropyl alcohol and acetyl acetone.

19. A pressure- sensitive adhesive composition comprising:
(a) an organic solvent;
(b) an external crosslinking agent; and
(c) an interpolymer having an average glass transition temperature of less than −25° C., said interpolymer having had polymerized into its molecule:
(i) an internal crosslinking monomer having an ethylenically unsaturated group and a functionality which subsequently forms a direct covalent bond to an adjacent polymeric segment;
(ii) a polymerizable proton-donating monomer having at least one hydrogen atom which is sufficiently reactive to allow said proton-donating monomer to bind said external crosslinking agent when said proton-donating monomer is contacted with said external crosslinking agent, and (iii) at least 40% (by weight of said interpolymer) of an alkyl acrylate;

wherein said interpolymer is formed in a polymerization reaction which includes addition of a delayed reactant mixture following initiation of polymerization, said mixture comprising additional acrylic monomers and more than 10% of a chain transfer solvent selected from the group consisting of alcohols, mercaptans and keto compounds capable of undergoing enol conversion, wherein said delayed reactant mixture is present, in whole or in part, during at least 50% of the total polymerization reaction time, and wherein said delayed reactant mixture, when fully added, raises the concentration of said chain transfer solvent to greater than 10% (by weight of polymerizable material);

wherein said interpolymer has a Williams Plasticity Number (measured in the absence of external crosslinking agents) of between 0.4 and 1.2.

20. A pressure-sensitive adhesive composition comprising an organic solvent and interpolymers having a glass transition temperature below $-10°$ C., said interpolymers comprising an internal crosslinking monomer which is an alkyl acrylamidoglycolate alkyl ether;

wherein said interpolymers result from a polymerization reaction which includes addition of a delayed reactant mixture after initiation of polymerization, said mixture comprising additional acrylic monomers and more than 7% of a chain transfer solvent (by weight of polymerizable materials in said mixture), said delayed reactant mixture being present, in whole or in part, for a period greater than 20% of the total reaction time, and wherein the total amount of chain transfer solvent charged before polymerization is terminated exceeds 7% (by total weight of polymerizable material charged during polymerization).

21. The composition of claim 20, wherein said internal crosslinking monomer has the formula:

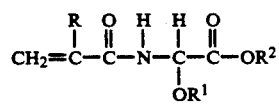

wherein R is hydrogen or methyl, and $R^1$ and $R^2$ are each selected from the group consisting of $C_{1-6}$ alkyls and $C_{5-6}$ cycloalkyls.

22. The composition of claim 20, wherein said monomer is methyl acrylamidoglycolate methyl ether.

23. A pressure sensitive adhesive composition, comprising interpolymers in organic solution, said interpolymers having a glass transition temperature of less than $-10°$ C. and said interpolymers derived from a first internal crosslinking monomer and also a second internal crosslinking monomer which is more reactive than said first internal crosslinking monomer, said first and second internal crosslinking monomers each having an ethylenically unsaturated group and a functionality which subsequently forms a direct covalent bond to an adjacent polymeric segment;

wherein said interpolymers result from a polymerization reaction which includes addition of a delayed reactant mixture after initiation of polymerization, said mixture comprising additional acrylic monomers and more than 7% of a chain transfer solvent (by weight of polymerizable materials in said mixture), said delayed reactant mixture being present, in whole or in part, for a period greater than 20% of the total reaction time, and wherein the total amount of chain transfer solvent charged before polymerization is terminated exceeds 7% (by total weight of polymerizable material charged during polymerization).

24. The composition of claim 23, wherein said second monomer is a polymerizable alkoxy silane.

25. A pressure-sensitive adhesive composition comprising an organic solvent, an external crosslinking agent, interpolymers derived from a first internal crosslinking monomer which is an alkyl acrylamidoglycolate alkyl ether, a second internal crosslinking monomer which is more reactive than said first monomer, said second internal crosslinking monomer having an ethylenically unsaturated and a functionality which subsequently forms a direct covalent bond to an adjacent polymeric segment, and an acrylic monomer having reactive hydrogen atoms, said interpolymers having been formed by a polymerization reaction in the presence of at least about 2% (by weight of polymerizable material present) of a chain transfer solvent, and said interpolymers having a glass transition temperature below $-10°$ C.;

wherein said interpolymers result from a polymerization reaction which includes addition of a delayed reactant mixture after initiation of polymerization, said mixture comprising additional acrylic monomers and more than 7% of a chain transfer solvent (by weight of polymerizable materials in said mixture), said delayed reactant mixture being present, in whole or in part, for a period greater than 20% of the total reaction time, and wherein the total amount of chain transfer solvent charged before polymerization is terminated exceeds 7% (by total weight of polymerizable material charged during polymerization).

* * * * *